(12) United States Patent
Yoshioka et al.

(10) Patent No.: US 9,806,441 B2
(45) Date of Patent: Oct. 31, 2017

(54) CONNECTING STRUCTURE FOR BUS BAR AND ELECTRICAL WIRE

(71) Applicant: YAZAKI CORPORATION, Minato-ku, Tokyo (JP)

(72) Inventors: Nobuaki Yoshioka, Shizuoka (JP); Keigo Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/645,586

(22) Filed: Mar. 12, 2015

(65) Prior Publication Data

US 2015/0188244 A1 Jul. 2, 2015

Related U.S. Application Data

(63) Continuation of application No. PCT/JP2013/075125, filed on Sep. 18, 2013.

(30) Foreign Application Priority Data

Sep. 19, 2012 (JP) .................................. 2012-205335

(51) Int. Cl.
*H01R 11/11* (2006.01)
*H01M 2/20* (2006.01)
(Continued)

(52) U.S. Cl.
CPC ............... *H01R 11/11* (2013.01); *H01M 2/20* (2013.01); *H01M 2/206* (2013.01); *H01M 2/32* (2013.01);
(Continued)

(58) Field of Classification Search
CPC ........ H01R 4/184; H01R 4/185; H01R 4/188; H01R 4/182; H01R 11/11; H01R 4/62;
(Continued)

(56) References Cited

U.S. PATENT DOCUMENTS 3,030,603 A * 4/1962 Olsson ................. H01R 13/115
439/442
3,715,705 A 2/1973 Kuo
(Continued)

FOREIGN PATENT DOCUMENTS

JP H09-223523 A 8/1997
JP 2003-045409 A 2/2003
(Continued)

OTHER PUBLICATIONS

The extended European search report dated Jan. 26, 2016 in the counterpart European patent application.
(Continued)

*Primary Examiner* — Harshad C Patel
(74) *Attorney, Agent, or Firm* — Metrolexis Law Group, PLLC

(57) ABSTRACT

A connecting structure uses a crimp terminal to connect a bus bar and an electrical wire together. The crimp terminal includes a bus bar-connecting section to be crimped to the bus bar, and an electrical wire-connecting section to be crimped to an end of the electrical wire. At least one of the bus bar-connecting section and the electrical wire-connecting section is provided with an oxide film breaking means for breaking an oxide film on the bus bar or a core wire on the end of the electrical wire.

10 Claims, 3 Drawing Sheets

(51) Int. Cl.
   *H01R 4/18*      (2006.01)
   *H01R 11/05*     (2006.01)
   *H01M 2/32*      (2006.01)
   *H01R 4/62*      (2006.01)

(52) U.S. Cl.
   CPC ............ *H01R 4/182* (2013.01); *H01R 4/184* (2013.01); *H01R 4/185* (2013.01); *H01R 4/188* (2013.01); *H01R 11/05* (2013.01); *H01R 4/62* (2013.01)

(58) Field of Classification Search
   CPC ....... H01R 411/05; H01M 2/32; H01M 2/206; H01M 2/20
   USPC .................. 439/442, 877, 887, 882, 879
   See application file for complete search history.

(56) References Cited

U.S. PATENT DOCUMENTS

| | | | | |
|---|---|---|---|---|
| 3,831,132 A * | 8/1974 | Bowden, Jr. | ........... | H01R 4/188 439/442 |
| 7,722,416 B2 * | 5/2010 | Gump | ................... | H01R 4/188 439/879 |
| 7,867,014 B2 * | 1/2011 | Kuwayama | ........... | H01R 4/185 439/452 |
| 8,221,171 B2 * | 7/2012 | Ono | ....................... | H01R 4/185 439/877 |
| 2011/0244309 A1 * | 10/2011 | Byun | ................... | H01M 2/043 429/158 |
| 2011/0294368 A1 * | 12/2011 | Nakata | ................... | H01R 13/03 439/887 |
| 2012/0208410 A1 | 8/2012 | Ikeda et al. | | |
| 2012/0295496 A1 | 11/2012 | Suzuki | | |
| 2012/0322320 A1 * | 12/2012 | Takase | ............... | H01M 2/1077 439/732 |

FOREIGN PATENT DOCUMENTS

| | | |
|---|---|---|
| JP | 2003-243057 A | 8/2003 |
| JP | 2004-199934 A | 7/2004 |
| JP | 2006-004733 A | 1/2006 |
| JP | 2008-234935 A | 10/2008 |
| JP | 2010-015900 A | 1/2010 |
| JP | 2010-027505 A | 2/2010 |
| JP | 2010-225449 A | 10/2010 |
| JP | 2011-040332 A | 2/2011 |
| JP | 2011-187400 A | 9/2011 |
| JP | 2012-059500 A | 3/2012 |
| JP | 2012-059658 A | 3/2012 |

OTHER PUBLICATIONS

The Japanese Office Action dated May 10, 2016 in the counterpart Japanese patent application.
The Japanese Office Action dated Jul. 19, 2016 in the counterpart Japanese patent application.
The Japanese Duplicate of Opposition dated Jun. 23, 2017 in the counterpart Japanese patent application.

* cited by examiner

CONNECTING STRUCTURE FOR BUS BAR AND ELECTRICAL WIRE

CROSS REFERENCE TO RELATED APPLICATION

This is a continuation application based on PCT application No. PCT/JP2013/075125 filed on Sep. 18, 2013, which claims the benefit of priority from Japanese Patent Application No. 2012-205335 filed on Sep. 19, 2012, the entire contents of which are incorporated by reference herein.

BACKGROUND OF THE INVENTION

1. Field of the Invention

The present invention relates to a connecting structure for a bus bar and an electrical wire, and more particularly to a connecting structure for a bus bar and an electrical wire, for use in a power supply device mounted on an electric vehicle or a hybrid vehicle.

2. Description of the Related Art

An electric vehicle using an electric motor to travel or a hybrid vehicle using an electric motor in combination with an engine to travel needs a power supply device which supplies a high voltage and a high output to the electric motor, in order to travel smoothly. As the power supply device, a power supply device having a structure in which plural battery cells are connected in series is used.

Patent Literature 1 (Japanese Unexamined Patent Application Publication No. 2003-45409) discloses such a power supply device. The power supply device includes a battery module and a bus bar module. In the battery module, a battery cell is provided at one end with a positive electrode and at the other end with a negative electrode, and plural battery cells are arranged side by side under a condition where the positive electrode of one of adjacent battery cells is connected to the negative electrode of the other of the adjacent battery cells. The bus bar module contains plural bus bars which provide connections between the adjacent battery cells of the battery module and between the battery cells and an external device.

The plural battery cells are connected in series in such a manner that the positive electrode of one of the adjacent battery cells and the negative electrode of the other battery cell pass through the bus bar. An end of an electrical wire (voltage detection wire) is connected to the bus bar thereby to measure a potential of each battery cell or a voltage of the battery module. Patent Literature 1 discloses a structure in which the bus bar and a voltage detection terminal to which a core wire on the end of the electrical wire has been clamped and connected, are fastened together thereby to provide an electrical connection between the bus bar and the voltage detection terminal.

Patent Literatures 2 (Japanese Unexamined Patent Application Publication No. 2011-40332) and 3 (Japanese Unexamined Patent Application Publication No. 2012-59658) each disclose a conventional structure for connection between the bus bar and the electrical wire such as the voltage detection wire.

In the connecting structure disclosed in Patent Literature 2, the bus bar is welded to the core wire on the end of the electrical wire thereby to provide an electrical connection between the bus bar and the electrical wire. This eliminates the need for a process for connecting the voltage detection terminal to the end of the electrical wire and a process for fastening the bus bar and the voltage detection terminal together.

In the connecting structure disclosed in Patent Literature 3, a crimp terminal separate from the bus bar is used to crimp the electrical wire and the bus bar together thereby to provide an electrical connection between the bus bar and the electrical wire.

In the connecting structure disclosed in Patent Literature 2, the core wire on the end of the electrical wire is merely welded to the bus bar, and thus, if the electrical wire vibrates due to vibrations or the like, stress acts directly on a welded portion. Therefore, this structure has the problem of impairing reliability of connection. A clamping portion for a coating portion of the electrical wire linked to the welded portion may be set in order to solve the problem. In this case, however, a process for welding the core wire and a process for clamping the coating portion of the electrical wire are necessary, thus leading to a complicated connection operation.

In the connecting structure disclosed in Patent Literature 3, the crimp terminal is used to crimp the electrical wire and the bus bar together, and thus, the vibrations of the electrical wire has little direct influence. However, if the bus bar or the core wire of the electrical wire is made of an aluminum material, an oxide film develops on the surface of the bus bar or the core wire. The oxide film increases contact resistance on a crimp surface of the bus bar and the electrical wire, thus leading to the problem of causing heat generation or the like.

SUMMARY OF THE INVENTION

An object of the present invention is to provide a connecting structure for a bus bar and an electrical wire, which achieves a simple connecting operation for the bus bar and the electrical wire and does not impair electrical connection performance even if the bus bar or a core wire of the electrical wire is made of an aluminum material.

According to a first aspect of the present invention, there is provided a connecting structure for a bus bar and an electrical wire, including: a bus bar configured to provide a connection between a plurality of battery cells or between a battery cell and a first external device; an electrical wire connected to a second external device and configured to be electrically connected to the bus bar; and a crimp terminal configured to connect the bus bar and the electrical wire together, in which the crimp terminal includes a bus bar-connecting section to be crimped to the bus bar, and an electrical wire-connecting section to be crimped to an end of the electrical wire, and at least one of the bus bar-connecting section and the electrical wire-connecting section is provided with an oxide film breaking means for breaking an oxide film on the bus bar or a core wire on the end of the electrical wire.

According to a second aspect of the present invention, the bus bar includes a bus bar body to be connected to the battery cell, and a bus bar crimp portion formed in the shape of a plate protruding from the bus bar body, and configured to be crimped to the bus bar-connecting section of the crimp terminal, the electrical wire includes the core wire, and a coating portion coating an outer periphery of the core wire, the electrical wire-connecting section of the crimp terminal includes a core wire crimp portion provided on the bus bar-connecting section side, and a coating clamping portion provided on the opposite side from the bus bar-connecting section, and the oxide film breaking means is a serration formed on at least one of the bus bar-connecting section and the core wire crimp portion.

According to a third aspect of the present invention, the serration or plural ridges configured to restrain an axial misalignment of the core wire and thereby retain the core wire, are formed on the core wire crimp portion of the crimp terminal.

According to the first aspect of the present invention, at least one of the bus bar-connecting section and the electrical wire-connecting section of the crimp terminal is provided with the oxide film breaking means for breaking the oxide film on the bus bar or the core wire on the end of the electrical wire. Therefore, even if the bus bar or the core wire on the end of the electrical wire is made of an aluminum material and an oxide film develops on the surface of the aluminum material, the oxide film can be broken by crimping the crimp terminal. As a result, there is no increase in contact resistance due to the oxide film, which in turn enables preventing impairment of electrical connection performance of the bus bar or the core wire on the end of the electrical wire.

A connection between the bus bar and the core wire on the end of the electrical wire and fixing of the coating portion of the electrical wire can be accomplished merely by a process for crimping the crimp terminal to the bus bar and the electrical wire. Therefore, the number of processes for connection is reduced, thus achieving a simplification of a connection operation.

According to the second aspect of the present invention, the crimp terminal includes the bus bar-connecting section, the core wire crimp portion, and the coating clamping portion. Thus, the connection between the bus bar and the core wire on the end of the electrical wire and the fixing of the coating portion of the electrical wire can be accomplished merely by crimping the crimp terminal to the bus bar and the electrical wire. Therefore, the simplification of the connection operation is achieved.

The oxide film breaking means is the serration formed on at least one of the bus bar-connecting section and the core wire crimp portion of the crimp terminal. Thus, edge portions of the serration bite into the bus bar or the core wire on the end of the electrical wire, thereby breaking the oxide film. Therefore, there is no increase in the contact resistance due to the oxide film, which in turn enables preventing the impairment of the electrical connection performance of the bus bar or the core wire on the end of the electrical wire.

According to the third aspect of the present invention, the serration or the plural ridges configured to restrain the axial misalignment of the core wire and thereby retain the core wire, are formed on the core wire crimp portion of the crimp terminal. Therefore, even if the core wire is made of the aluminum material, the oxide film on the core wire can be broken, and a good connection between the electrical wire and the crimp terminal can be achieved.

DESCRIPTION OF THE EMBODIMENTS

Figure 1:
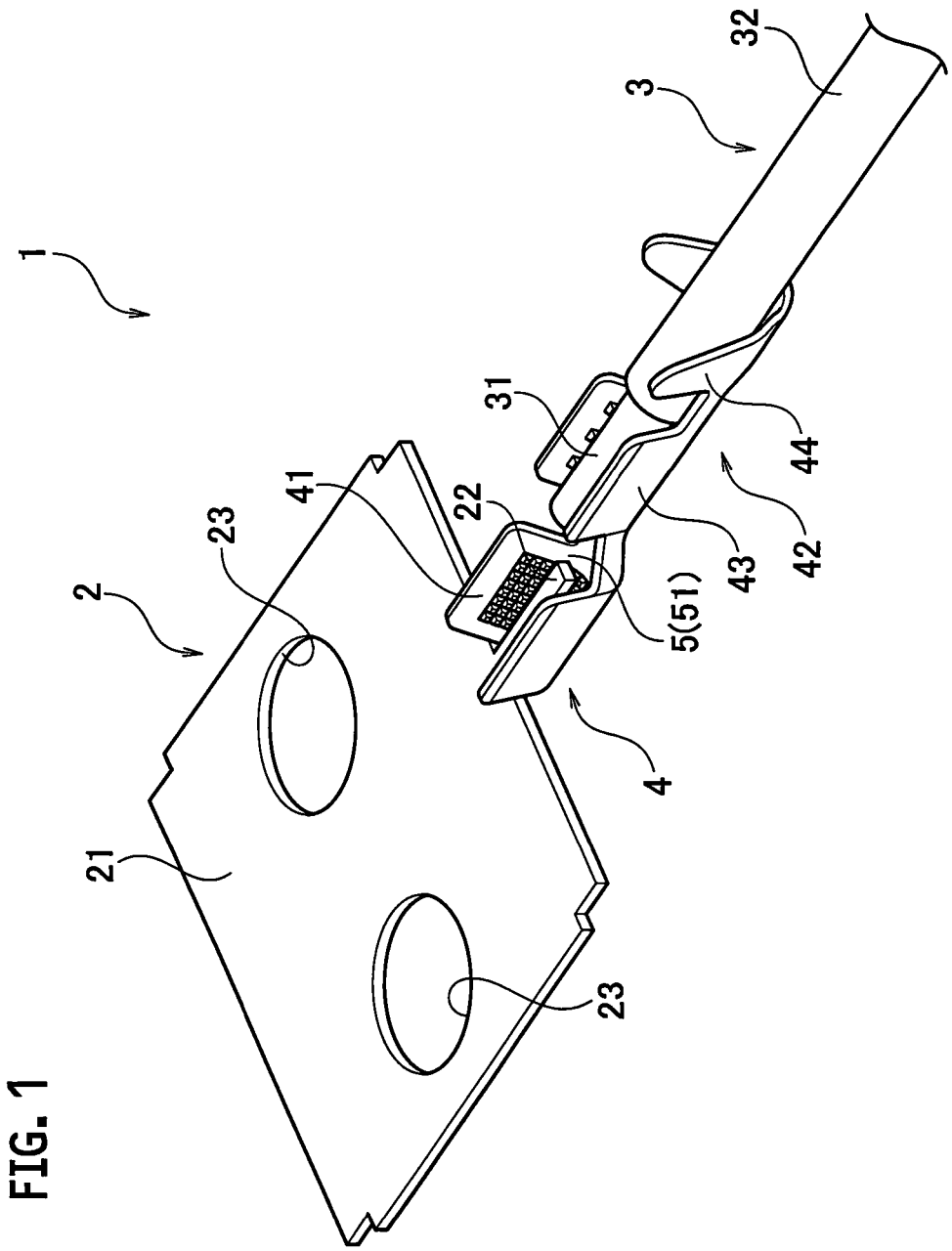
FIG. 1 is a perspective view illustrating a connecting structure for a bus bar and an electrical wire according to an embodiment of the present invention.

An embodiment of the present invention will be described in detail below with reference to FIGS. 1 to 3.

A connecting structure 1 uses a crimp terminal 4 to connect a bus bar 2 and an electrical wire 3 together. The connecting structure 1 is used in a power supply device mounted on an electric vehicle or a hybrid vehicle.

The power supply device (not illustrated) includes plural battery cells arranged side by side. Each of the battery cells has one end at which a positive electrode and a negative electrode protrude. The plural battery cells are arranged in such a manner that the positive electrode of one of the adjacent battery cells is connected to the negative electrode of the other battery cell. The bus bar 2 connects the adjacent battery cells in series or provides a connection between the battery cell and an external device. Thus, the number of the bus bars 2 for use in the connecting structure 1 is set according to the number of battery cells and the number of external devices.

The bus bar 2 includes a bus bar body 21 and a bus bar crimp portion 22, and is made of an electrically conductive metal such as an aluminum material or a copper material. In the embodiment, the bus bar 2 is made of the aluminum material. Due to the fact that the bus bar 2 is made of the aluminum material, an oxide film develops on the surface of the bus bar 2 with the passage of time. However, the oxide film on the bus bar crimp portion 22 is broken by an oxide film breaking means 5 formed in the crimp terminal 4.

The bus bar body 21 is formed in the shape of a flat plate such as a rectangular, and is connected to the battery cell or the external device. For this connection, the bus bar body 21 has two through-holes 23 formed therethrough, and the positive electrode and the negative electrode of the battery cell or a terminal of the external device pass through the through-holes 23. The bus bar crimp portion 22 is formed in the shape of a plate, protruding outward from an end portion of the bus bar body 21. The crimp terminal 4 is crimped to the bus bar crimp portion 22. This crimping allows the bus bar crimp portion 22 to be connected to the crimp terminal 4.

A coated electrical wire constructed of a core wire 31 and a coating portion 32 coating an outer periphery of the core wire 31 is used as the electrical wire 3. The core wire 31 is formed to a predetermined thickness by twisting plural strands made of a copper material. The coating portion 32 is made of an insulating resin. The electrical wire 3, with the core wire 31 exposed by peeling the coating portion 32, is connected via the crimp terminal 4 to the bus bar 2.

The crimp terminal 4 is clamped to the bus bar 2 and the electrical wire 3 thereby to provide an electrical connection between the bus bar 2 and the electrical wire 3. The crimp terminal 4 includes a bus bar-connecting section 41 and an electrical wire-connecting section 42. The crimp terminal 4 is made of an electrically conductive metal such as stainless steel or spring steel.

The bus bar-connecting section 41 of the crimp terminal 4 is crimped to the bus bar crimp portion 22 of the bus bar 2. This allows an electrical connection between the crimp terminal 4 and the bus bar 2.

Figure 3:
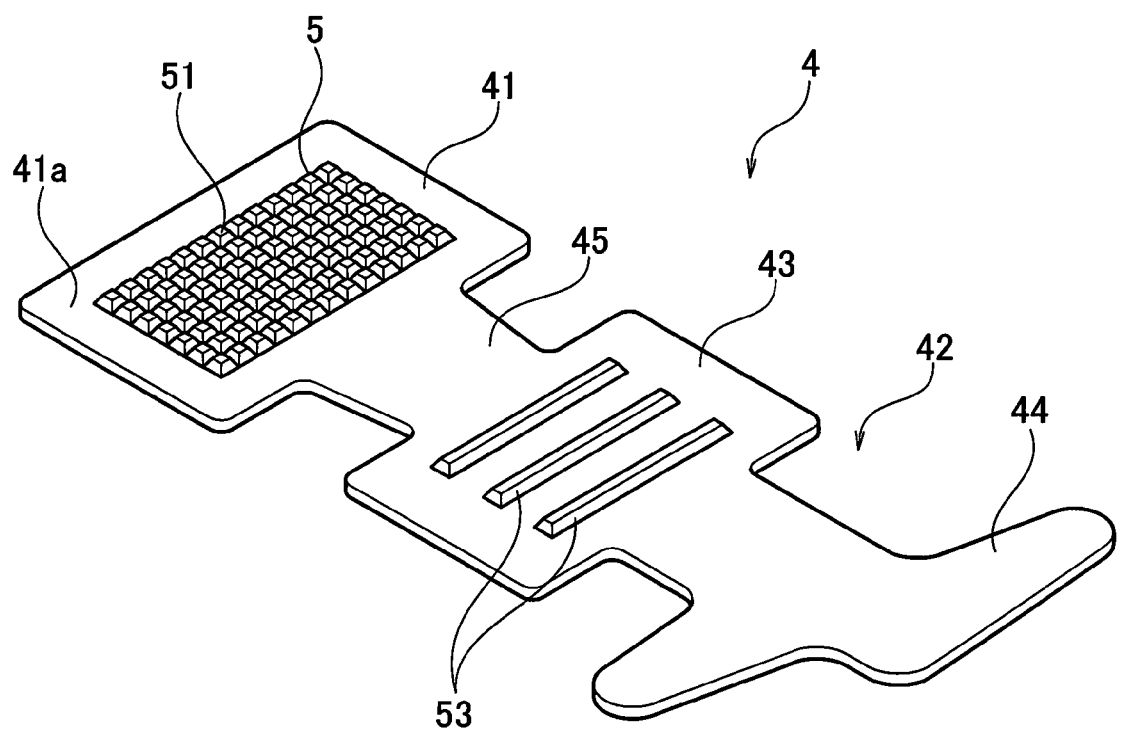
FIG. 3 is a perspective view of a crimp terminal according to the embodiment of the present invention.

As illustrated in FIG. 3, the electrical wire-connecting section 42 is formed so as to be linked via a linking portion 45 to the bus bar-connecting section 41, and the electrical wire-connecting section 42 includes a core wire crimp portion 43 and a coating clamping portion 44.

The core wire crimp portion 43 is located in a portion (on the bus bar-connecting section 41 side) in which the electrical wire-connecting section 42 is adjacent to the linking portion 45. The core wire crimp portion 43 is crimped to the core wire 31 of the peeled electrical wire 3. This allows an electrical connection between the crimp terminal 4 and the electrical wire 3. The coating clamping portion 44 is disposed on the opposite side from the portion in which the electrical wire-connecting section 42 is adjacent to the linking portion 45. The coating clamping portion 44 is clamped to the coating portion 32 of the electrical wire 3. The coating clamping portion 44 is clamped thereby to fix the crimp terminal 4 to the electrical wire 3.

Figure 2:
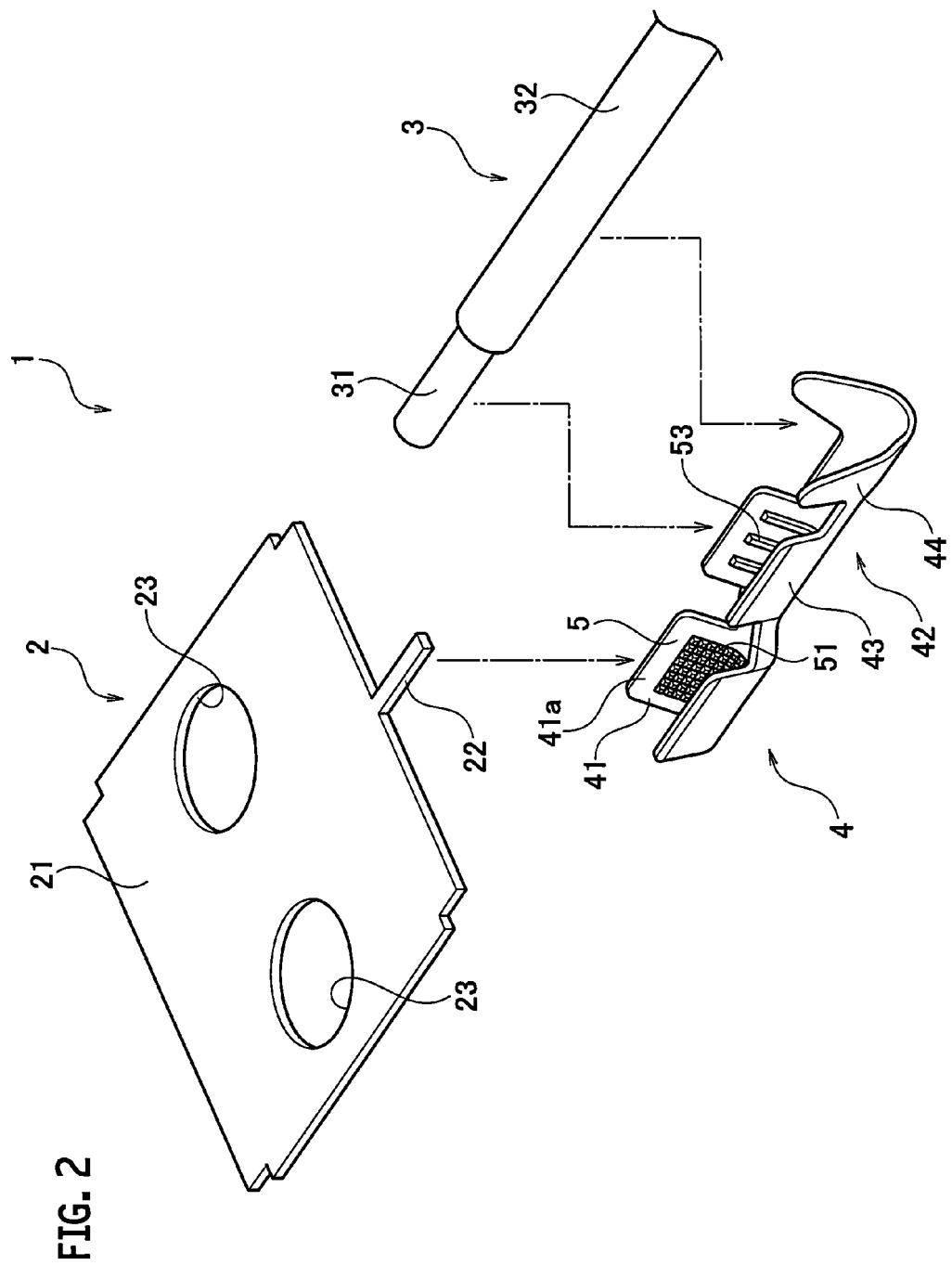
FIG. 2 is an exploded perspective view of the connecting structure for the bus bar and the electrical wire according to the embodiment of the present invention.

The oxide film breaking means 5 is formed in the crimp terminal 4, as illustrated in FIGS. 2 and 3. In the embodiment, the oxide film breaking means 5 is provided on a crimp surface 41a at a top surface of the bus bar-connecting section 41. The oxide film breaking means 5 is formed of a serration 51 of the crimp surface 41a of the bus bar-connecting section 41. The serration 51 is formed by forming plural small rectangular grooves in the crimp surface 41a of the bus bar-connecting section 41. The plural rectangular grooves are arranged in a grid pattern on the crimp surface 41a of the bus bar-connecting section 41. When the crimp terminal 4 is crimped to the bus bar crimp portion 22, the oxide film on the surface of the bus bar crimp portion 22 is broken by the serration 51.

As illustrated in FIGS. 2 and 3, plural ridges 53 are formed on the core wire crimp portion 43 of the crimp terminal 4. The plural ridges 53 are formed along a direction substantially orthogonal to an axial direction of the core wire 31 of the electrical wire 3. The plural ridges 53 are formed on the core wire crimp portion 43 thereby to restrain an axial misalignment of the core wire 31 crimped to the core wire crimp portion 43 and thus enable retaining the core wire 31.

Next, assembly of the connecting structure 1 of the embodiment will be described.

As illustrated in FIG. 2, the bus bar crimp portion 22 of the bus bar 2 is placed on the bus bar-connecting section 41 of the crimp terminal 4, the core wire 31 exposed by peeling the electrical wire 3 is placed on the core wire crimp portion 43 of the crimp terminal 4, and the coating portion 32 of the electrical wire 3 is placed on the coating clamping portion 44 of the crimp terminal 4. In this position, the bus bar-connecting section 41, the core wire crimp portion 43 and the coating clamping portion 44 are clamped thereby to crimp the bus bar-connecting section 41 to the bus bar crimp portion 22 and crimp the core wire crimp portion 43 to the core wire 31 of the electrical wire 3. Thereby, the bus bar 2 and the electrical wire 3 are electrically connected via the crimp terminal 4. In addition, the coating clamping portion 44 is crimped to the coating portion 32 of the electrical wire 3 thereby to retain the electrical wire 3 on the crimp terminal 4.

In a process of crimping the crimp terminal 4 to the bus bar 2, since the serration 51 is formed on the bus bar-connecting section 41, edge portions of the plural rectangular grooves forming the serration 51 bite into the bus bar crimp portion 22 of the bus bar 2. This biting breaks the oxide film even if the oxide film develops on the bus bar crimp portion 22. Therefore, a conductor of the bus bar crimp portion 22 comes into direct contact with the bus bar-connecting section 41, thus achieving a good electrical connection between the bus bar 2 and the crimp terminal 4. As a result, there is no increase in contact resistance due to the oxide film, which in turn enables preventing heat generation.

In addition, the plural ridges 53 formed on the core wire crimp portion 43 bite into the core wire 31 of the electrical wire 3 to thus restrain the axial misalignment of the core wire 31. Therefore, a good connection between the electrical wire 3 and the crimp terminal 4 is achieved.

According to the embodiment, a connection between the bus bar 2 and the core wire 31 of the electrical wire 3 and fixing of the coating portion 32 of the electrical wire 3 can be accomplished merely by a process for crimping the crimp terminal 4 to the bus bar 2 and the electrical wire 3. Therefore, the number of processes for connection is reduced, thus achieving a simplification of a connection operation.

The bus bar-connecting section 41 of the crimp terminal 4 is provided with the oxide film breaking means 5 formed of the serration 51. Therefore, even if the bus bar 2 is made of the aluminum material, when the crimp terminal 4 is crimped to the bus bar 2, the oxide film on the bus bar 2 is broken. As a result, connection without impairment of electrical connection performance can be accomplished.

The plural ridges 53 are formed on the core wire crimp portion 43 of the crimp terminal 4 to thus enabling restraining the axial misalignment of the core wire 31. Therefore, the crimp terminal 4 can retain the core wire 31 with reliability.

In the embodiment, description has been given with regard to a case where the bus bar 2 is made of the aluminum material. Meanwhile, if the core wire 31 of the electrical wire 3 is made of an aluminum material, the core wire crimp portion 43 of the crimp terminal 4 is provided with the oxide film breaking means 5 formed of the serration 51, and thereby, when the crimp terminal 4 is crimped to the electrical wire 3, the oxide film on the core wire 31 can be broken. In other words, the core wire crimp portion 43 is provided with the oxide film breaking means 5, and thereby, even if the oxide film develops on the core wire 31, the crimp terminal 4 is crimped to the electrical wire 3 thereby to enable breaking the oxide film on the core wire 31. Therefore, impairment of the electrical connection performance between the electrical wire 3 and the crimp terminal 4 can be prevented.

If the bus bar 2 and the core wire 31 of the electrical wire 3 are made of the aluminum material, the bus bar-connecting section 41 and the core wire crimp portion 43 of the crimp terminal 4 are provided with the oxide film breaking means 5 formed of the serration 51, and thereby, when the crimp terminal 4 is crimped to the bus bar 2 and the electrical wire 3, the oxide films on the bus bar 2 and the core wire 31 can be broken.

Although the serration 51 is formed of the plural rectangular grooves arranged in the grid pattern, the serration 51 may be formed of plural oblong grooves arranged in one direction.

What is claimed is:

1. A connecting structure for a bus bar and an electrical wire, comprising:
   a bus bar comprising a bus bar body and a bus bar crimp portion protruding from the bus bar body;
   an electrical wire that includes a core wire, and a coating portion coating an outer periphery of the core wire; and
   a crimp terminal,
   wherein
   the crimp terminal includes a bus bar-connecting section to be crimped to the bus bar crimp portion of the bus bar, an electrical wire-connecting section to be crimped to an end of the electrical wire, and a linking portion that is provided between the bus bar-connecting section and the electrical wire-connecting section in an axial direction of the electrical wire, the bus bar-connecting section, the linking portion, and the electrical wire-connecting section are arranged in a straight line along the axial direction of the electrical wire, a width of the linking portion is smaller than that of the bus bar-connecting section, the width of the linking portion is smaller than that of the electrical wire-connecting section, the bus bar-connecting section is provided with an oxide film breaking portion configured to break an oxide film on the bus bar crimp portion, the electrical wire-connecting section of the crimp terminal comprises a core wire crimp portion provided on a bus bar-connecting section side of the electrical wire-connecting section where the electrical wire-connecting section is adjacent to the linking portion, the bus bar-connecting section includes a first side and a second side, the core wire crimp portion includes a first side and a second side, the first side and the second side of the bus bar-connecting section and the first side and the second side of the core wire crimp portion are arranged in an order of the first side of the bus bar-connecting section, the second side of the bus bar-connecting section, the first side of the core wire crimp portion, and the second side of the core wire crimp portion, along the axial direction of the electrical wire, the linking portion is provided between the second side of the bus bar-connecting section and the first side of the core wire crimp portion, the bus bar crimp portion of the bus bar extends in the bus bar-connecting section no further than the second side of the bus bar-connecting section, and the core wire extends in the core wire crimp portion no further than the first side of the core wire crimp portion.

2. The connecting structure for the bus bar and the electrical wire, according to claim 1, wherein the electrical wire includes the core wire, and a coating portion coating an outer periphery of the core wire, the electrical wire-connecting section of the crimp terminal further comprises a coating clamping portion provided on the opposite side from the bus bar-connecting section, and the oxide film breaking portion comprises a serration formed on the bus bar-connecting section.

3. The connecting structure for the bus bar and the electrical wire, according to claim 2, wherein the serration or a plurality of ridges configured to restrain an axial misalignment of the core wire and thereby retain the core wire, are formed on the core wire crimp portion of the crimp terminal.

4. The connecting structure for the bus bar and the electrical wire, according to claim 1, wherein the oxide film breaking portion extends continuously along the axial direction of the crimped electrical wire.

5. The connecting structure for the bus bar and the electrical wire, according to claim 1, wherein the oxide film breaking portion comprises rectangular grooves arranged in a grid pattern.

6. The connecting structure for the bus bar and the electrical wire, according to claim 1, wherein the bus bar is formed of an aluminum material or an copper material.

7. The connecting structure for the bus bar and the electrical wire, according to claim 1, wherein the crimp terminal is made of stainless steel or spring steel.

8. The connecting structure for the bus bar and the electrical wire, according to claim 1, wherein the bus bar body of the bus bar has a flat plate shape and the bus bar crimp portion of the bus bar has a shape of the plate protruding from the bus bar body, the bus bar body is formed with a through hole through which an electrode or a terminal is to be passed.

9. The connecting structure for the bus bar and the electrical wire, according to claim 1, wherein the electrical wire-connecting section is provided with an oxide film breaking portion configured to break an oxide film on a core wire of the electrical wire, such that the both of the electrical wire-connecting section and the bus bar-connecting section are provided with the oxide film breaking portions.

10. The connecting structure for the bus bar and the electrical wire, according to claim 9, wherein the bus bar and the core wire of the electrical wire are made of aluminum material.

* * * * *